United States Patent
Cordts

(10) Patent No.: US 6,928,777 B2
(45) Date of Patent: Aug. 16, 2005

(54) METHOD AND APPARATUS FOR FIRESTOPPING A THROUGH-PENETRATION

(75) Inventor: Brandon L. Cordts, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/295,502

(22) Filed: Nov. 15, 2002

(65) Prior Publication Data

US 2004/0093815 A1 May 20, 2004

(51) Int. Cl.⁷ .............................................. E04C 2/52
(52) U.S. Cl. ................................... 52/220.8; 52/317
(58) Field of Search .......................... 52/317, 220.8, 52/220.1, 784.11, 232, 218

(56) References Cited

U.S. PATENT DOCUMENTS

| | | | |
|---|---|---|---|
| 4,304,079 A | * | 12/1981 | Thorsten ..................... 174/48 |
| 4,493,173 A | | 1/1985 | Kohaut |
| 4,496,790 A | | 1/1985 | Spencer |
| 4,731,501 A | | 3/1988 | Clark et al. |
| 4,791,994 A | | 12/1988 | Ho |
| 4,931,339 A | | 6/1990 | Malcolm-Brown |
| 5,003,127 A | | 3/1991 | Sosinski et al. |
| 5,326,060 A | * | 7/1994 | Chubb et al. ............ 248/231.9 |
| 5,373,932 A | | 12/1994 | Stöbich et al. |
| 5,765,332 A | * | 6/1998 | Landin et al. ........... 52/396.01 |
| 6,536,169 B2 | * | 3/2003 | Dykhoff ..................... 52/220.8 |
| 6,848,227 B2 | * | 2/2005 | Whitty ....................... 52/232 |

FOREIGN PATENT DOCUMENTS

DE 4319072 * 12/1994
EP 0 994 286 A1 4/2000

* cited by examiner

Primary Examiner—Milton Nelson, Jr.
(74) Attorney, Agent, or Firm—David B. Patchett

(57) ABSTRACT

An apparatus for creating a firestopping barrier in a through-penetration includes a support mechanism arranged within the through-penetration, firestop material movably connected with the support mechanism, and firestop material arranged between the firestop material movably connected with the support mechanism and the inner surface of the through penetration.

19 Claims, 4 Drawing Sheets

METHOD AND APPARATUS FOR FIRESTOPPING A THROUGH-PENETRATION

FIELD OF THE INVENTION

The present invention relates generally to firestopping and, more particularly, to a method and apparatus for firestopping an opening in a wall, floor, or ceiling having items such as cables or wires passing there through.

BACKGROUND OF THE INVENTION

One mechanism by which smoke and fire may spread from one compartment of a building to another is through passages or openings, often referred to as through-penetrations, in floors, walls, ceilings, or the like. Such openings are provided to allow for the passage of cables, wires, pipes or the like within the building.

Current methods used to prevent the spread of fire and passage of smoke through such openings use intumescent sheets that are cut to follow the contour of the penetrating cables. A bead of moldable intumescent putty is provided along the perimeter of the sheets.

While such techniques are generally satisfactory for resisting the spread of fire and preventing the passage of smoke from one compartment to another, installation is labor intensive, time consuming, and expensive. In addition, when intumescent sheets, bricks, or pillows are used, they must be mechanically attached to or physically compressed in the opening, or both, to pass the hose stream portion of the fire test defined in ASTM E814-02. Firestops fabricated in this manner also do not lend themselves to repeated re-entry for inspection, do not readily allow additional cables or wires to be run through the opening, and do not allow cables to be readily removed from the opening. To remove cables from a typical through-penetration, for example, requires the existing intumescent material to be removed, discarded, and replaced with completely new intumescent material. This procedure is time consuming, expensive, and wasteful. Because through-penetrations may be opened and closed numerous times during the life of a building to add or remove items from the opening, the costs associated with such systems can be significant.

Furthermore, such systems require cover plates to meet fire and architectural demands. Cover plates are typically made of 0.25 inch (6.4 millimeters) steel which makes them difficult to fabricate. Typically, such cover plates must be removed from the area of the through-penetration or even from the building to make necessary modifications.

Even though the present invention does not require a cover plate, some form of cover may be desirable in floor applications for safety reasons. However, because the present invention does not require a cover plate for floor openings, end users may select materials of their choice that are easier and less costly to modify. Alternatively, the apparatus according to the present invention may be combined with a cover plate capable of being extended and retracted to adapt to the items passing through the opening.

Techniques for fire stopping through-penetrations are also known in the prior art. U.S. Pat. No. 4,496,790 (Spencer), for example, discloses a self-anchoring poke-thru wiring device for the extension of communication and/or electrical wiring through a passage in a floor designed to prevent the spread of fire from one side of the floor to the other.

U.S. Pat. No. 4,493,173 (Kohaut) discloses a cable passage closure and sealing device for positioning in an opening in a structure such as a floor or wall that is used for passing or connecting a cable or cables and cable conduits there through. The device automatically expands and seals itself and the cables and the cable conduits in the structural opening upon exposure to excess heat or fire.

These prior devices and techniques, however, suffer from certain drawbacks or shortcomings. Accordingly, there exists a need in the industry for a method and apparatus for firestopping a through-penetration that allows items passing through the opening to be readily added or removed. An adjustable firestop device that never needs to be removed or modified and is easy to open and close can provide considerable long-term cost saving to firestop users over currently available systems and techniques.

SUMMARY OF THE INVENTION

The present invention provides a method and apparatus for firestopping an opening in a wall, floor, or the like that is adjustable to allow items passing through the opening to be quickly and easily added or removed. Once installed, the device preferably remains in the place for the life of the opening. Thus, the device allows for the quick and easy installation or removal of items passing though the opening, but the device itself never needs to be removed or modified once it has been installed in the opening. The present invention finds particular application, for example, in the telecommunications industry where openings in walls, floors, and ceilings for cable passage are prevalent, and cables are frequently added to or removed from the opening.

In one aspect, the present invention provides an apparatus for creating a firestopping barrier in a through-penetration having at least one item passing there through including a support mechanism arranged within the through-penetration, firestop material movably connected with the support mechanism, and firestop material arranged between the firestop material movably connected with the support mechanism and the inner surface of the through penetration.

In another aspect, the present invention provides a method of firestopping a through-penetration comprising the steps of securing firestop material to at least a portion of the inner wall surface of the through-penetration, and arranging a support mechanism having firestop material movably connected thereto in the though-penetration within the firestop material secured to the inner wall surface of the through-penetration.

BRIEF DESCRIPTION OF THE DRAWINGS

The present invention will be further described with reference to the accompanying drawings, in which.

DETAILED DESCRIPTION

For the purpose of this invention, the following terms are used herein:

"firestop material" refers to intumescent, endothermic, and ablative materials useful in resisting the spread of fire and smoke from one compartment of a structure to another.

A firestop material may include an intumescent compound, an endothermic compound, or both an intumescent compound and an endothermic compound;

"intumescent material" refers to a material that expands to at least about 1.5 times its original volume upon heating to temperatures typically encountered in fire-like conditions.

Figure 1:
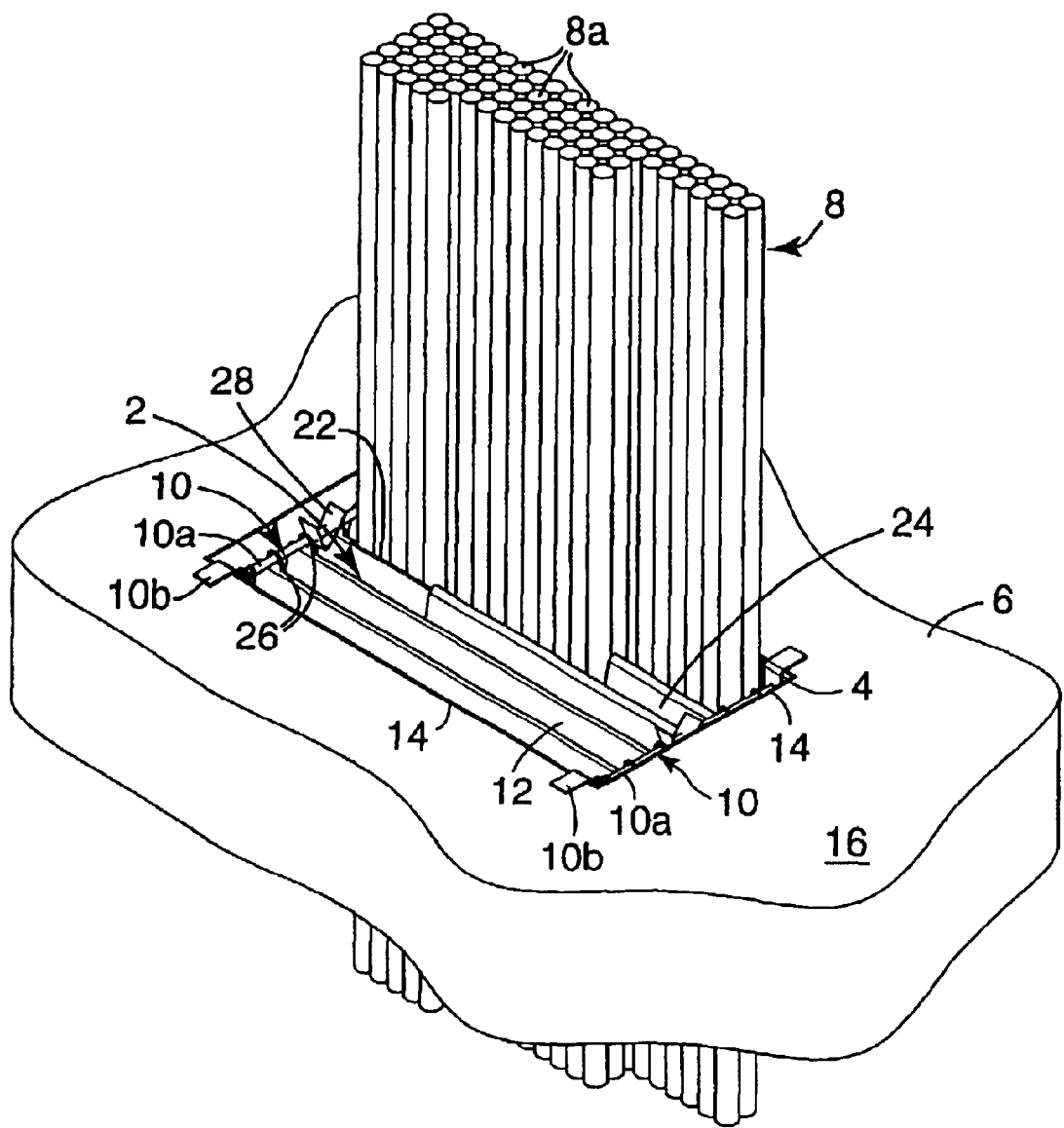
FIG. 1 is a perspective view of the firestopping apparatus installed in a through-penetration according to the invention.
Figure 2:
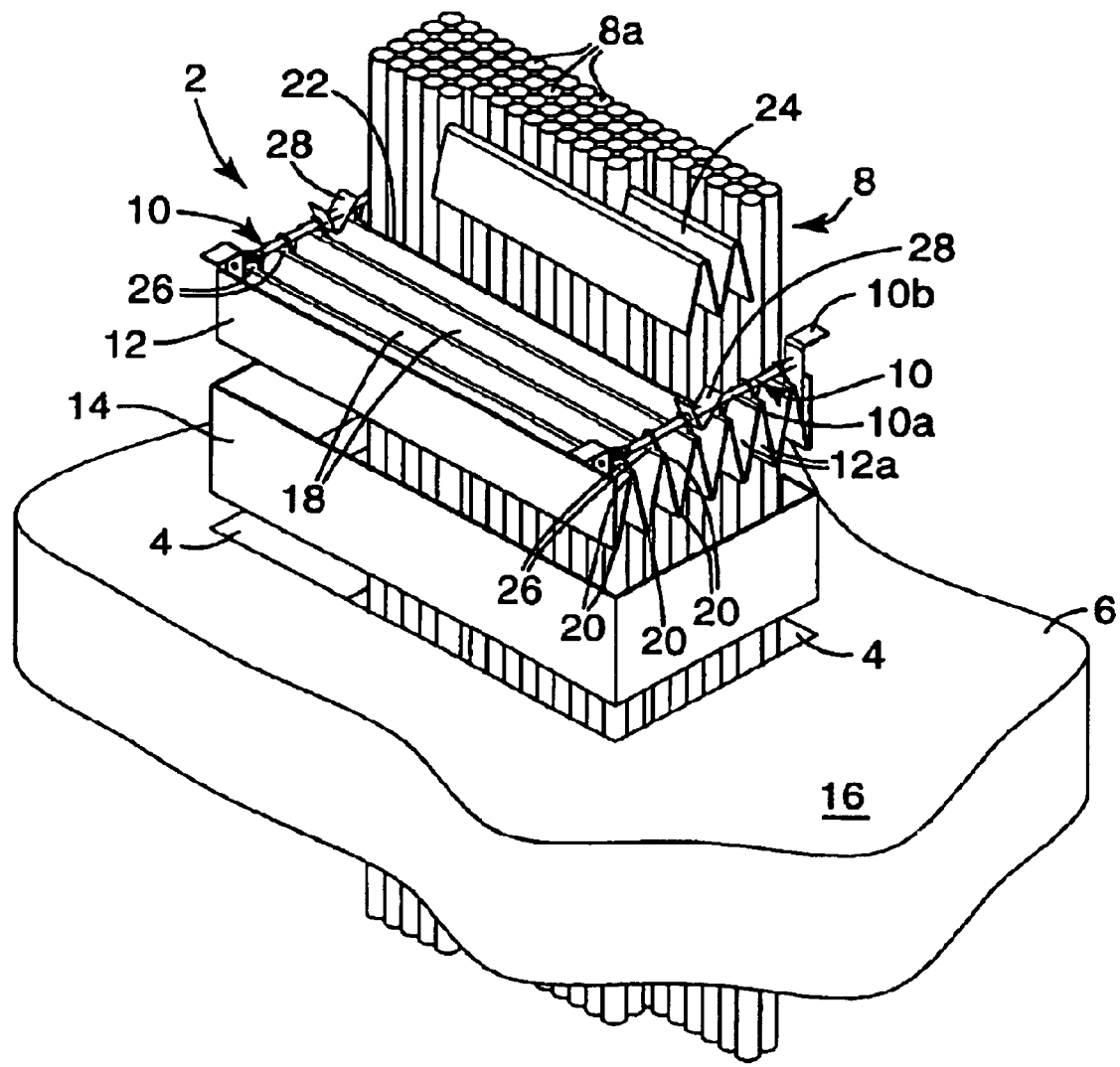
FIG. 2 is an exploded view of the firestopping apparatus of FIG. 1.
Figure 3:
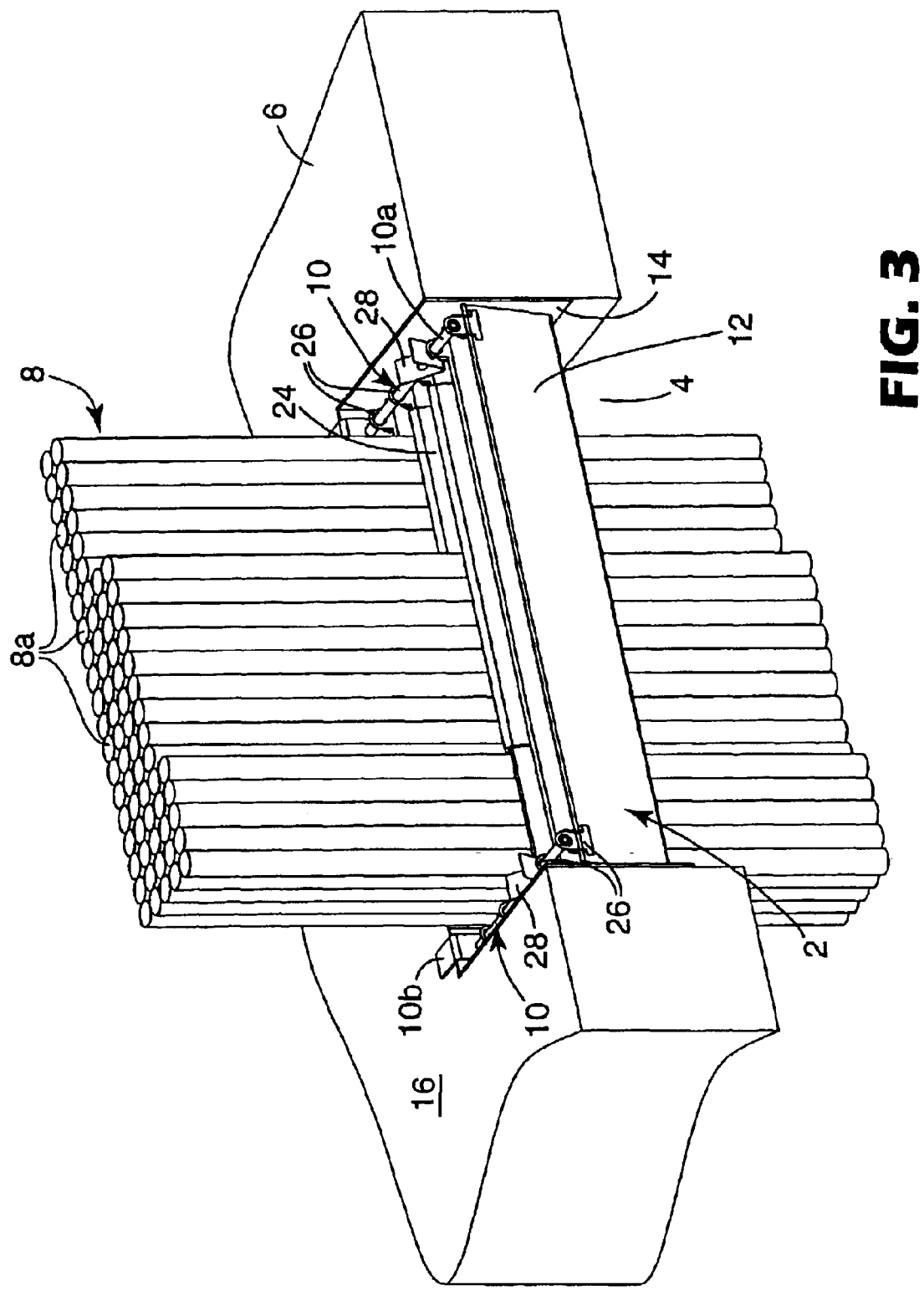
FIG. 3 is a perspective view of the firestopping apparatus of FIG. 1 showing the front of the apparatus.

"endothermic material" refers to a material that absorbs heat, typically by releasing water of hydration, by going through a phase change that absorbs heat (i.e. liquid to gas), or by other physical or chemical change where the reaction requires a net absorption of heat to take place;

Referring now to the drawings, FIGS. 1–3 show an apparatus 2 arranged in an opening or through-penetration 4 in a partition 6 such as a floor, ceiling or wall. A plurality of individual items 8a, such as bundle of cables, wires, or the like, form a bundle 8 that passes through the through-penetration 4. The apparatus 2 includes a support mechanism 10 arranged in the through-penetration 4, a first firestop material 12 movably connected with the support mechanism 10, and a second firestop material 14 arranged around the apparatus 2 adjacent the inner surface of the through-penetration 4.

The support mechanism 10 includes a pair of support rails 10a that extend along opposite sides of the bundle 8 adjacent opposed inner surfaces of the through-penetration 4. The support mechanism 10 is secured to the through-penetration 4 via brackets 10b provided on opposite ends of each support rail 10a that engage the inner surface of the through-penetration 4 or, in the case of a floor installation, simply rest on the top surface 16 of the partition 6.

It will be recognized that a wide variety of devices including manually operable threaded devices such as thumb screws, turnbuckles, spring loaded devices, or other mechanical devices capable expanding to securely hold the support rack in place within the through-penetration may be used to secure the support mechanism 10 within the through-penetration. Such devices may also include locks to prevent accidental release of the device. In addition, conventional fasteners such as nails, screws, and the like may be used to secure the support rack in a through-penetration.

In accordance with a characterizing feature of the invention, the first firestop material 12 is a single piece of material having a generally zigzag cross section with a plurality of adjacent panels 18 each separated by an alternating fold line 20 which allow the first firestop material 12 to be repeatably and reversibly extended and retracted. In this manner, the first firestop material 12 can be moved between retracted condition (not shown), wherein a leading edge 22 of the first firestop material 12 is spaced from the bundle 8, and an extended condition wherein the leading edge 22 of the first firestop material 12 abuts the bundle 8. By retracting the firestop material 12, individual items 8a may be quickly and easily added to or removed from the bundle 8 without permanently altering the firestop material 12. And once items have been added to or removed from the bundle, the firestop material 12 may be once again extended to provide maximum coverage of the opening 4.

The first 12 and second 14 firestop materials may include at least one outer layer of an infrared blocking layer such as a layer of metal foil, a layer of intumescent material, an endothermic material, or a combination of intumescent material and endothermic material, a layer of fiberglass cloth, and a plastic film layer. A preferred construction of the first 12 and second 14 firestop materials is a multi-layer laminate including an outer layer of a stainless steel foil, an intumescent layer, a fiberglass cloth, and an opposed outer layer of thin plastic and/or metal film or foil. The stainless steel acts as a carrier for the intumescent layer. The fiberglass cloth acts as an insulator during a fire and thereby decreases the thermal conductivity of the firestop. The fiberglass cloth also serves to reinforce the entire system during the hose stream portion of the requisite ASTM fire test. The opposed outer film or foil layer encloses the system and allows instructions or logos to be printed on the firestop material.

Suitable infrared blocking layers include metal foils that reflect a large amount of infrared radiation. A preferred infrared blocking layer material is NEXTEL Flamestopping Dot Paper available from 3M Company, St. Paul, Minn. This material and other vitreous materials reflect a large portion of radiation in the infrared spectrum and are thus useful as infrared radiation blockers. Such materials have the further advantage of having melting points above those temperatures found in most fires. Furthermore, their flexibility/drapability is higher than many metal foils.

The intumescent material contributes to the insulating ability of the firestop material by increasing the total volume of the material and creating a generally tight seal around the item in the through-penetration. The intumescent material provides for expansion of the firestop material of the present invention in an unconfined state to at least about 1.5 times the original thickness of the material when exposed to fire-like conditions, preferably at least about three times its original thickness, more preferably, four times its original thickness. For some uses, it is preferable that the firestop material expand to at least about nine times its original thickness. A preferred intumescent material is Interam™ Ultra GS, a graphite based, largely inorganic, flexible, fire resistive, intumescent mat available from the 3M Company, St. Paul, Minn.

Suitable endothermic materials include materials that thermally decompose, typically with the evolution of one or more small molecules such as ammonia, carbon dioxide, and/or water, which volatilize, or which react with one or more other compounds present within the firestop material or the surrounding atmosphere in a manner which provides a net uptake of thermal energy by the system.

Suitable endothermic materials include inorganic compounds that provide endothermic reaction or phase change without exothermic decomposition or combustion between 194 and 2732° F. (90 and 1500° C.). Exemplary compounds include aluminum trihydrate (ATH), $Al(OH)_3$ hydrated zinc borate ($ZnB_2O_4 \cdot 6H_2O$), calcium sulfate ($CaSO_4 \cdot 2H_2O$) also known as gypsum, magnesium ammonium phosphate ($MgNH_4PO_4 \cdot 6H_2O$), magnesium hydroxide ($Mg(OH)_2$), and encapsulated $H_2O$. Preferred endothermic agents include magnesium ammonium phosphate hexahydrate, $MgO \cdot _2B_2O_3 \cdot 9H_2O$, gypsum, and $MgHPO_4 \cdot 3H_2O$.

The first firestop material 12 includes optional side portions 12a that can be moved in and out of the regions along the sides of the bundle 8. In addition, a removable insert 24 may optionally be provided along the leading edge of the first firestop material 12. The insert 24 enhances the flexibility of the apparatus by allowing bundles of varying sizes and shapes to be easily accommodated without cutting or otherwise permanently altering the first firestop material 12. The insert 24 has a zigzag configuration that matches the configuration of the first firestop material 12 so that the insert 24 may be arranged in overlapping relation with the first firestop material 12. Thus, if relatively few items 8a are initially installed in the opening 4, the insert 24 can used to fill the opening 4. And if items 8a are later added to the opening 4, the insert 24 may be easily removed to provide additional area for the items. It will be recognized that the insert 24 may be provided at either the leading edge 22 of the first firestop material 12 as shown in FIGS. 1–3, or on the edge opposite the leading edge 22 between the first firestop material 12 and the inner surface of the through-penetration.

The insert 24 may also be customized to accommodate bundles 8 having an uneven or countered shape such as the bundle shown in FIGS. 1–3, for example, which has a layer of items 8a ranging from two items thick to 4 items thick. For such an installation, the insert is simply cut to match the profile of the bundle. If items are later added, the insert can be modified accordingly, or a new insert customized to the new bundle profile can be used. If an insert 24 were not used, the first firestop material 12 itself would have to be altered and possibly replaced as items were added or removed from the through-penetration. Thus, the insert 24 provides flexibility and considerable cost savings for accommodating varying bundle sizes and geometries.

The first firestop material 12 includes aligned hanging members 26 containing holes that slidably connect with the support rails 10a, thereby to slidably connect the first firestop material 12 with the support mechanism 10. It will be recognized that a variety of clips, clamps, and conventional mechanical devices may be used to slidably attach the first firestop material 12 with the support mechanism The second firestop material 14 is a sheet or mat of firestop material preferably having a thickness of about ⅛ inch (3.2 millimeters) to about ½ inch (12.7 millimeters). The firestop material 14 is arranged around the first firestop material 12 adjacent the inner surface of the through-penetration. The second firestop material 14 may be affixed to the inner surface of the through-penetration using conventional means including adhesives or mechanical fasteners.

The support mechanism 10 may optionally include V-shaped spacers 28 that can be arranged between adjacent panels, thereby to maintain the first firestop material 12 in a selected extended condition.

Figure 4:
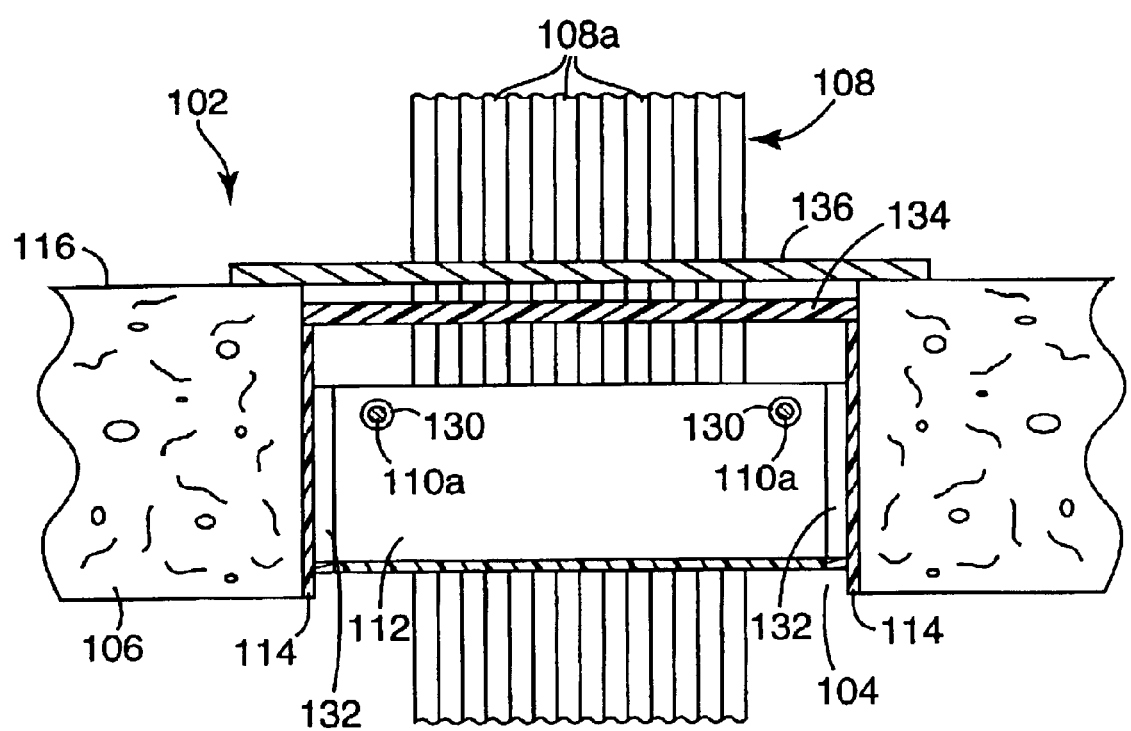
FIG. 4 is a sectional view of a second embodiment of the invention.

FIG. 4 shows a second apparatus 102 according to the invention, wherein functionally similar features to those in FIGS. 1–3 are referred to with like reference numerals incremented by 100.

The apparatus 102 is arranged in a through-penetration 104 in a partition 106 such as a floor, ceiling or wall, having a plurality of individual items 108a forming a bundle 108, such as bundle of cables, wires, or the like, passing there through. The apparatus 102 includes a support mechanism 110 having a pair of support rails 110a, a first firestop material 112 movably connected with the support rails 110a, and a second firestop material 114 arranged around the apparatus 102 adjacent the inner surface of the through-penetration 104. The support rails 110a extend through the first firestop material 112 along opposite sides of the bundle 108 adjacent opposed inner surfaces of the through-penetration 104. Thus, in contrast to the embodiment of FIGS. 1–3, the first firestop material 112 is movably connected with the support rails 110a by providing aligned holes 130 in the first firestop material 112 through which the support rails extend. In this manner, the first firestop material 112 is slidably connected directly with the support rails 110a, and the clips 10b are eliminated.

The opposed side edge surfaces of the first firestop material 112 include gasket-like surfaces 132 arranged to engage and conform to opposite inner surfaces of the through-penetration, thereby to form a tight seal between the associated surfaces. Additional gasket surfaces may also be provided on the leading and/or trailing edges of the first firestop material 112, thereby to form a tight seal with the bundle 108 and/or the inner surface of the through-penetration 104, respectively. Alternatively, the second firestop material 114 may include a gasket-like surface (not shown) arranged to engage and conform to the side edges of the first firestop material 112, thereby to form an air tight seal between the associated surfaces.

The apparatus 102 may further include an optional barrier 134 arranged within the through-penetration 104 above the apparatus 102 to prevent the passage of smoke through the through-penetration. The barrier 134 may alternatively be arranged below the apparatus 102, or barriers may be provided both above and below the apparatus 102. In addition, the barrier 134 may be arranged within the through-penetration or may be secured to the top 116 or bottom surface of the partition 106. The barrier 134 may be formed of a wide variety of gas or air impermeable materials including plastic films or foams such as closed cell foams. The barrier 134 may be attached to the partition 106 or to the inner surface of the through-penetration using a variety of conventional means including adhesive or mechanical fasteners.

The apparatus 102 is also preferably provided with a cover 136. It is particularly desirable to provide such a cover over the apparatus 102 and the through-penetration 104 when the apparatus 102 is installed in a floor for safety reason. The cover 136 may be secured to the top surface 116 of the partition 106 using conventional fastening means and is preferably secured in a manner that allows the cover to be readily removed to allow access to the apparatus 102.

A through-penetration 104 may be fire stopped using the apparatus 102 by first securing firestop material 114 to at least a portion of the inner wall surface of the through-penetration 104 and then arranging a support mechanism 110 having firestop material 112 movably connected thereto in the though-penetration within the firestop material 114. An optional barrier 134 may be arranged either in or adjacent to the through-penetration 104 to prevent the passage of smoke through the through-penetration 104, and an optional cover 136 may be provided over the through-penetration 104 adjacent the barrier 134.

EXAMPLE

In order that the invention described herein can be more fully understood, the following example is set forth. It should be understood that the example is for illustrative purposes only, and is not to be construed as limiting this invention in any manner.

A firestopping apparatus having a design similar to the one shown in FIG. 4, except the barrier 134 and cover 136 were not included, was installed in a through-penetration formed in a concrete floor eight inches thick according to ASTM E814-02. The first firestop material 12 and second firestop material 14 were multi-layer laminates including a stainless steel foil first outer layer, a layer of Interam™ Ultra GS intumescent mat arranged adjacent the stainless steel foil layer, a fiberglass cloth arranged adjacent the Interam™ Ultra GS intumescent mat, and a second outer layer of stainless steel foil arranged adjacent the fiberglass cloth. The second firestop material 14 was adhered to the inner wall surface of the through-penetration.

Prior to conducting the test, the apparatus repeatedly opened and closed (i.e. retracted and extended) to demonstrate the re-entry capability of the apparatus. The apparatus was then tested according to the fire and hose stream portions of ASTM E814-02. During the test, it was observed that the expansion pressure of the first and second firestop materials exerted a force against the inner wall surfaces of the through-penetration and the items passing through the through-penetration. The apparatus passed both portions of the test. Thus, the apparatus according to the present invention was able to pass both the fire and hose stream portions of the test standard set forth in ASTM E814-02 without a cover.

It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. An apparatus for creating a firestopping barrier in a through-penetration, the apparatus comprising:
   (a) a support mechanism configured to span a through-penetration;
   (b) a first firestop material movably connected with said support mechanism; and
   (c) a second firestop material positioned adjacent an exterior of said first firestop material.

2. An apparatus as defined in claim 1, wherein said first firestop material is a multi-layer laminate including a first metal foil layer, a layer of intumescent material, a fiberglass cloth, and at least one of a plastic film and a second metal foil layer.

3. An apparatus as defined in claim 1, further comprising a cover configured to cover an end of a through-penetration.

4. An apparatus as defined in claim 1, wherein said second firestop material has a thickness of from about ⅛ inch to about +e,fra 2+ee inch.

5. An apparatus as defined in claim 1, further comprising a gasket disposed between said first firestop material and said second firestop material.

6. An apparatus as defined in claim 5, further comprising a gasket coupled to said first firestop material and a separate gasket configured to seal between said first firestop material and an inner surface of a through-penetration.

7. An apparatus as defined in claim 1, further comprising a removable insert removably connected to said first firestop material.

8. An apparatus as defined in claim 7, wherein said first firestop material and said removable insert have a zigzag cross section.

9. An apparatus as defined in claim 1, wherein said support mechanism includes a pair of support rails.

10. An apparatus as defined in claim 1, wherein said first firestop material includes aligned hanging members, each said hanging member defining a hole adapted for slidably attaching said hanging member to said support mechanism.

11. An apparatus as defined in claim 9, wherein said first firestop material defines a plurality of aligned holes for slidably receiving each said support rail.

12. An apparatus as defined in claim 1, further comprising a smoke barrier arranged adjacent at least one of a top surface and a bottom surface of said apparatus.

13. An apparatus as defined in claim 12, wherein said smoke barrier is formed of a plastic film.

14. An apparatus as defined in claim 12, wherein said smoke barrier is formed of a closed cell foam.

15. An apparatus as defined in claim 1, wherein said first firestop material is a one-piece firestop material configured to repeatably and reversibly translate between an expanded state and a retracted state.

16. An apparatus as defined in claim 15, wherein said first firestop material has a zigzag cross section defining a plurality of panels separated by fold lines, wherein each said panel extends substantially perpendicular to a direction in which said first firestop material is extendable and retractable.

17. An apparatus as defined in claim 16, wherein said first firestop material includes a side portion extending from a main portion, said side portion having a length less than a length of said main portion.

18. An apparatus as defined in claim 16, further comprising spacers arranged between adjacent panels for maintaining said first firestop material in a selected position.

19. A combination through-penetration and firestopping barrier comprising:
   a surface defining a through-penetration;
   at least one item projecting through said through-penetration; and
   a firestopping apparatus disposed within said through-penetration, said apparatus including:
      a support mechanism including a pair of support rails, each of said support rails disposed on opposing sides of said at least one item and spanning said through-penetration,
      a first firestop material movably connected to said support rails, said first firestop material extending along said support rails between said at least one item and an inner surface of said through-penetration,
   a second firestop material coupled to said inner surface of said through-penetration.

* * * * *

UNITED STATES PATENT AND TRADEMARK OFFICE
CERTIFICATE OF CORRECTION

PATENT NO. : 6,928,777 B2 Page 1 of 1
APPLICATION NO. : 10/295502
DATED : August 16, 2005
INVENTOR(S) : Cordts, Brandon L.

It is certified that error appears in the above-identified patent and that said Letters Patent is hereby corrected as shown below:

Column 7 -- Line 37 - In Claim 4, delete "+e,fra 2+ee" and insert - - 1/2 - -, therefor.

Column 8 -- Line 1 - In Claim 10, delete "claim 1," and insert - - claim 9, - -, therefor.

Signed and Sealed this

Eighth Day of August, 2006

JON W. DUDAS
*Director of the United States Patent and Trademark Office*